United States Patent [19]

Klauke et al.

[11] Patent Number: 4,615,423
[45] Date of Patent: Oct. 7, 1986

[54] HUB FOR A TWO-WHEELED VEHICLE

[75] Inventors: Dieter Klauke, Bergrheinfeld; Werner Steuer, Schweinfurt, both of Fed. Rep. of Germany

[73] Assignee: Fichtel & Sachs AG, Schweinfurt, Fed. Rep. of Germany

[21] Appl. No.: 523,740

[22] Filed: Aug. 16, 1983

[30] Foreign Application Priority Data

Aug. 17, 1982 [DE] Fed. Rep. of Germany ....... 3230509

[51] Int. Cl.$^4$ .................... F16D 41/30; B60B 27/04
[52] U.S. Cl. .................... 192/64; 301/105 B; 29/159.3
[58] Field of Search .................... 192/6 R, 6 A, 64; 301/105 B; 29/159.3

[56] References Cited

U.S. PATENT DOCUMENTS

| 2,143,798 | 1/1939 | Ribe | 192/6 A |
| 2,481,327 | 9/1949 | Millray | 192/6 R |
| 2,988,186 | 6/1961 | Dotter | 192/64 |
| 3,170,549 | 2/1965 | Baker, III | 192/6 R |
| 3,865,220 | 2/1975 | Thompson, Jr. | 192/64 X |
| 3,892,301 | 7/1975 | Frei et al. | 192/6 R |
| 4,059,028 | 11/1977 | Schulz et al. | 74/781 B |
| 4,351,569 | 9/1982 | Steuer et al. | 301/6 V |
| 4,355,706 | 10/1982 | Pan | 192/6 R X |
| 4,400,999 | 8/1983 | Steuer | 192/6 A X |

FOREIGN PATENT DOCUMENTS

| 522516 | 11/1955 | Belgium | 192/6 R |
| 25306 | 12/1919 | Denmark | 192/6 R |
| 1277051 | 4/1969 | Fed. Rep. of Germany . | |
| 1505936 | 4/1970 | Fed. Rep. of Germany | 192/64 |
| 3032504 | 9/1981 | Fed. Rep. of Germany . | |
| 543133 | 5/1956 | Italy | 192/64 |
| 376640 | 7/1932 | United Kingdom | 192/6 R |
| 487126 | 6/1938 | United Kingdom | 192/6 R |
| 594169 | 11/1947 | United Kingdom . | |

Primary Examiner—Rodney H. Bonck
Assistant Examiner—Richard M. Lorence
Attorney, Agent, or Firm—Toren, McGeady, Stanger, Goldberg & Kiel

[57] ABSTRACT

A hub is proposed for a two-wheeled vehicle comprising a hub spindle (1) and a hub sleeve (3) mounted rotatably on the hub spindle (1). The hub sleeve (3) is formed as a light metal die-casting, one (39) of the two spoke flanges (39, 41) being integrally cast to the hub sleeve, while the other, separately produced spoke flange (41) is rigidly secured to a seating surface (43, 45) cast to the die-casting. In the entire external circumferential surface of the die-casting the radial distance of the outer circumferential surface from the rotation axis, starting from an external circumference with maximum diameter, exclusively decreases or at least remains constant with increasing axial distance from the maximum external circumference. Furthermore in the entire internal circumferential surface of the die-casting the radial distance of the internal circumferential surface from the rotation axis, starting from an internal circumference with minimum diameter, exclusively increases or likewise at least remains constant with increasing axial distance from the minimum internal circumference. Such a hub sleeve body can be cast in a mold without pushers and requires no subsequent machining or cutting work.

8 Claims, 7 Drawing Figures

HUB FOR A TWO-WHEELED VEHICLE

BACKGROUND OF THE INVENTION

The invention relates to a hub for a two-wheeled vehicle, especially a pedal cycle.

Conventional cycle hubs comprise a hub spindle and a hub sleeve mounted rotatably on the hub spindle. The hub sleeve carries two concentric spoke flanges spaced axially from one another. The hub sleeve is frequently a casting to which the two spoke flanges are integrally cast. The production of such castings is relatively expensive. The hub sleeves have a plurality of undercuttings so that pushers have to be provided on the casting molds in order that the castings may be removed from the molds. Furthermore the castings must be finished by cutting shaping.

STATEMENT OF PRIOR ART

In order to simplify the production of such hub sleeves it is known from U.S. Pat. No. 4,351,569 to manufacture the hub sleeve from a plurality of deep-drawn sheet metal parts. However even this kind of hub sleeve must be subjected to subsequent cutting or lathing work.

It is known from British Pat. No. 594,169 to weld a hub sleeve for cycles together from a plurality of individual parts. Especially in this known cycle hub, both spoke flanges are produced separately and subsequently welded to the multi-part hub sleeve. Apart from the relatively great manufacturing expense, the manufacturing tolerances of this cycle hub leaves something to be desired.

Finally from German Pat. No. 1,277,051 and from German Publication Specification No. 30 32 504, cycle hubs are known to the hub sleeve of complicated form of which separately produced spoke flanges are secured subsequently. Especially in drive hubs of this kind the danger exists that the spoke flanges may detach themselves from the hub sleeve by reason of the drive or brake moments acting upon them.

OBJECT OF THE INVENTION

It is an object of the invention to indicate a hub for a two-wheeled vehicle, especially a bicycle, the hub sleeve of which can be manufactured completely without cutting. The hub sleeve including the spoke flanges provided thereon should satisfy the highest requirements as regards accuracy of circularity of cylindrical regions of the hub sleeve. At the same time the spoke flanges should be capable of securely taking up the torque occurring in operation and any axial wheel forces.

SUMMARY OF THE INVENTION

This object is achieved in that the hub sleeve is formed as a metal die-casting to which one of the two spoke flanges is integrally cast. The other spoke flange is secured on a seating surface cast to the metal die-casting. In the whole of the external circumferential surface or external peripheral surface of the metal die-casting the radial distance of the external circumferential surface from the sleeve rotation axis is dimensioned so that, starting from an external circumference with maximum diameter, especially the external circumference of the cast-on spoke flange, with increasing axial distance from the maximum external circumference the radial distance exclusively decreases or at least remains constant. For the whole of the internal circumferential or peripheral surface of the metal die-casting it is provided that starting from an internal circumference with minimum diameter, of this minimum internal circumference with increasing axial distance from the minimum internal circumference the radial distance of the internal peripheral surface from the axis of rotation exclusively increases or likewise at least remains constant. Such a die-casting can be produced in pusherless casting molds. The casting mold can be opened by exclusively axial movement of its two mold halves and has no radially movable undercut pushers, cores, slides or the like of any kind. Since a die-casting is concerned the manufacturing tolerances can be made so small that all cutting finishing work is superfluous. Since in contrast to the known cycle hubs explained above only one of the spoke flanges is secured subsequently, whereas the other spoke flange is cast on integrally, the hub can securely take up relatively great torques and axial lateral forces. Complementary coupling elements which increase the torque transmittable between the spoke flange and the hub sleeve may if desired be provided on the subsequently fitted spoke flange and the seating surface formed on the die-casting for the securing of this spoke flange. Bearing bushes for ball bearings which mount the hub sleeve on the hub spindle can be integrally formed or cast on the die-casting. However they are preferably subsequently inserted. The same applies to internally toothed drive bushes of a freewheel, provided the hub is a drive hub, especially a geared drive hub. The die-casting consists preferably of aluminium or an aluminium alloy. The bearing bushes or drive bushes are then preferably manufactured from a harder material.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

Examples of embodiments of the invention are to be explained in greater detail hereinafter by reference to drawings, wherein.

DESCRIPTION OF THE PREFERRED EMBODIMENTS

Figure 1:
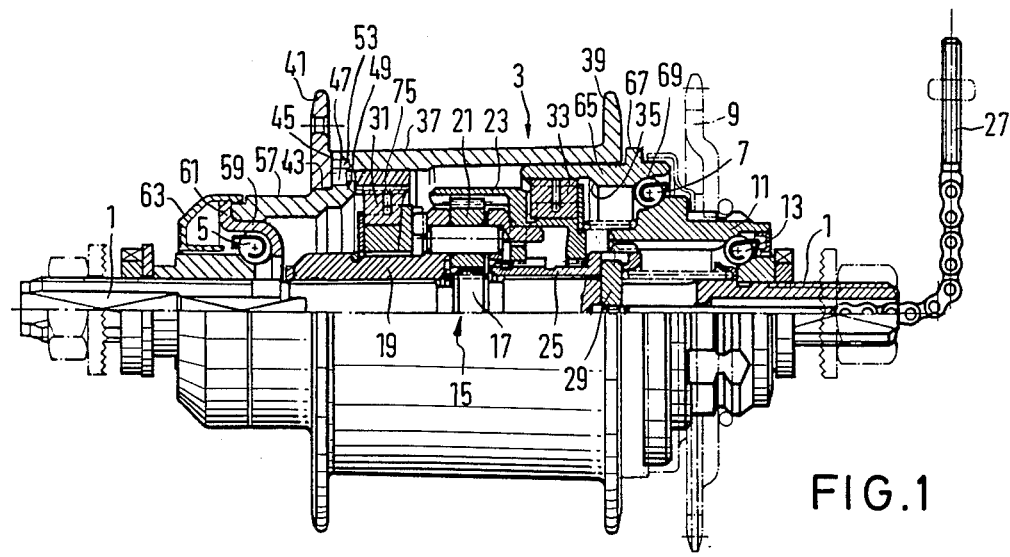
FIG. 1 shows a partially sectional three-speed freewheel drive hub of a pedal cycle.

FIG. 1 shows a three-speed freewheel drive hub of a bicycle with a hub spindle 1 extending through and to be fastened to the rear wheel fork of the bicycle. On the hub spindle 1 a hub sleeve body 3 is mounted rotatably but axially fixedly. The hub sleeve body 3 is mounted at its one end through a ball bearing 5 directly on the hub spindle 1 and at its other axial end through a ball bearing 7 on a drive member 11 carrying a chain wheel 9. The drive member 11 is in turn mounted rotatably on the hub spindle 1 through a ball bearing 13.

Within the hub sleeve body 3 there is accommodated a planetary gear 15 with a sun wheel 17 non-rotatably seated on the hub spindle 1, a plurality of planet wheels 21 mounted rotatably on a planet wheel carrier 19 and a hollow wheel 23. The drive member 11 is couplable selectively with the planet wheel carrier 19 or with the hollow wheel 23 by means of a coupling bush 25 rotatably mounted on the hub spindle 1, in dependence upon the axial position of a thrust block 29 displaceable in the hub spindle 1 by means of a draw linkage 27. The planet wheel carrier 19 in turn is in engagement through a ratchet 31 with the hub sleeve body 3. Likewise the hollow wheel 23 is in engagement with the hub sleeve body 3 through a freewheel ratchet 33.

In the position of the thrust block 29 as represented in FIG. 1 the rotation speed of the chain wheel 9 is stepped up to a higher rotation speed of the hub sleeve body 3. The torque path extends in forward pedalling as follows:- Chain wheel 9, drive member 11, coupling bush 25, planet wheel carrier 19, planet wheels 21, hollow wheel 23, ratchet 33, hub sleeve body 3. Since the hollow wheel 23 rotates at higher speed than the planet wheel carrier 19, the pawls of the ratchet 31 are over-run by the hub sleeve body 3.

If the thrust block 29 is shifted to the right by one step by the draw linkage 27, the coupling bush 25 is uncoupled from the planet wheel carrier 19 and coupled with the hollow wheel 23. The following torque transmission path results:- Chain wheel 9, drive member 11, coupling bush 25, hollow wheel 23, ratchet 33, hub sleeve body 3. The hollow wheel 23 and thus the hub sleeve body 3 rotate at the same rotation speed as the drive member 11. The pawls of the ratchet 31 are here over-run. The multi-speed hub is being driven in "direct gear".

On a further displacement of the thrust block 29 by one step to the right in FIG. 1 the coupling bush 25 entrains the hollow wheel 23 and thus the ratchet 33 with it in the axial direction. A control taper 35 of the hub sleeve body 3 pivots the pawls of the ratchet 33 out of their engagement with an internal toothing of the hub sleeve body 3, so that the ratchet 33 cannot transmit torque. The torque path proceeds as follows:- Chain wheel 9, drive member 11, coupling bush 25, hollow wheel 23, planet wheels 21, ratchet 31, hub sleeve body 3. Since the planet wheel carrier 19 is rotating more slowly than the hollow wheel 23 connected with the drive member 11, the rotation speed of the chain wheel 9 is stepped down.

Details of the present three-speed freewheel hub are described in U.S. Pat. No. 4,059,028, to which reference is hereby made.

The hub sleeve body 3 comprises a sleeve part 37 with two coaxial spoke flanges 39, 41 arranged at axial distance from one another. The spoke flange 39 adjacent to the drive member 11 and the sleeve part 37 are cast integrally as die-casting from aluminium or an aluminium alloy. The annular, separately produced spoke flange 41 is seated on a radially outwardly facing circumferential seating surface 43 and is resting with its side face facing the spoke flange 39 on an annular shoulder 45 of the sleeve part 37 facing away axially from the spoke flange 39. The faces 43, 45 are cast on the sleeve part 37. As may best be seen from FIGS. 2 and 3 the spoke flange 41 carries, on its side face intended to abut on the face 45, axially protruding studs 47 which fit into apertures 49 of the face 45. The studs 47 ensure a non-rotatable connection of the spoke flange 41 and the sleeve part 37. The studs 47 are provided with flattened portions 51 on their radially outer side related to the hub spindle, so that cavities 53 remain in the apertures 49 to receive adhesive with which the spoke flange 41 is secured to the sleeve part 37. In addition to or in place of the adhesion an annular extension part 55 can be formed by caulking in order to fix the spoke flange 41 axially on the sleeve part 37.

The external circumference of the spoke flange 39 forms the largest external diameter of the die-casting consisting of the sleeve part 37 and the spoke flange 39. The radial distance of every point of the external circumferential surface of the die-casting from the rotation axis of the hub sleeve body 3 is dimensioned so that with increasing axial distance from the maximum external diameter of the spoke flange 39 it exclusively decreases or at least remains constant. The minimum internal diameter of the internal circumferential surface of the sleeve part 37 is situated in the region of the ball bearing 5 on the end of the sleeve part 37 remote from the spoke flange 39. Starting from this minimal diameter the radial distance of every point of the internal circumferential surface exclusively increases or remains likewise constant with increasing axial distance. The die-casting can thus be cast in a die-casting mold which is exclusively axially openable. No radially movable undercutting pushers, cores or slides of any kind are necessary on the die-casting mold which are intended to render possible the removal of undercut parts from the mold. The surface of the die-casting produced in this manner requires no further finishing work, apart from any possible burr removal of the mold separation edge placed in the region of the external circumference of the spoke flange 39.

Several separately produced sleeves are pressed into the sleeve part 37. A sleeve or bearing shell 59 forming the outer race ring of the ball bearing 5 is pressed into an extension piece 57 of the sleeve part 37 lying axially opposite the spoke flange 39. The bearing shell is held with press fit in a hollow cylindrical seating surface of extension piece 57. The bearing shell 59 extends with a radially outwardly protruding flange 61 before the axial end face or shoulder surface of the extension piece 57. Thus, the outer race ring abuts with an axially oppositely directed shoulder surface on the shoulder surface of extension piece 57. Furthermore a dust cover 63 is fitted on the extension 57 and centres the radially outer edge of the flange 61 and protects the ball bearing 5 against soiling. The external diameter of the flange 61 is slightly larger than the external diameter of adjacent circumferential regions of the extension 57, for the sake of better centring and securing. From the side lying axially opposite to the ball bearing 5 a drive sleeve 65 is pressed into the sleeve part 37. A radially outwardly protruding annular flange 67 of the sleeve 65 lies against the facing side face of the spoke flange 39. Axially outside the sleeve part 37 the sleeve 65 is provided with a race track 69 of the ball bearing 7. The flanges 61 and 67 of the bearing shell 59 or the sleeve 65 fix the hub sleeve body 3 in relation to the hub spindle 1. Axially within the sleeve part 37 the sleeve 65 is provided with an internal toothing 71 of the ratchet 33 and with the control taper 35. Axially between the bearing shell 59 and the sleeve 65 a drive shell or sleeve 75 provided with an internal toothing 73 of the ratchet 31 is pressed into the sleeve part 37. In conformity with the growth in the axial direction of the internal diameter of the sleeve part 37, the drive shell 75 has a larger external diameter than the bearing shell 59. Correspondingly the external diameter of the sleeve 65 in turn is larger than the external diameter of the drive shell 75. The shells and sleeves 59, 65, 75 pressed into the sleeve part 37 can be provided on their external circumferences with a milling or the like improving the press fit. They consist preferably of a harder and thus lower-wearing material than the sleeve part 37, for example of steel.

Figure 2:
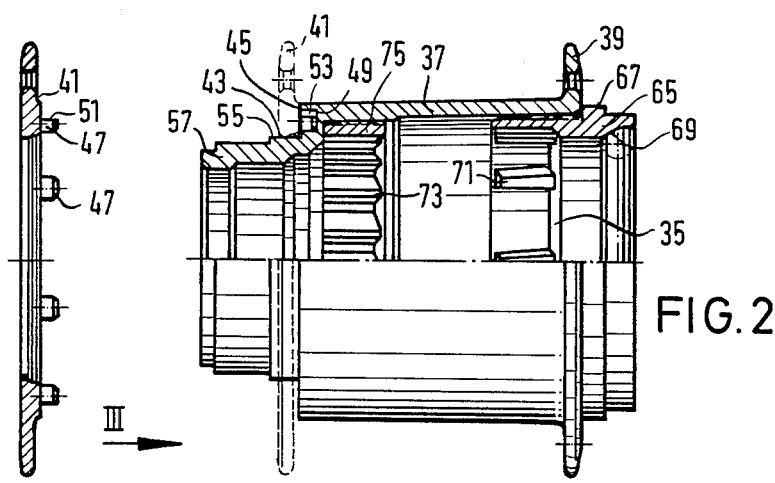
FIG. 2 shows a partially sectional exploded representation of a hub sleeve body of the drive hub according to FIG. 1.
Figure 3:
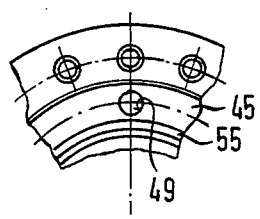
FIG. 3 shows a detail view of the hub sleeve body, seen in the direction of the arrow III in FIG. 2.
Figure 4:
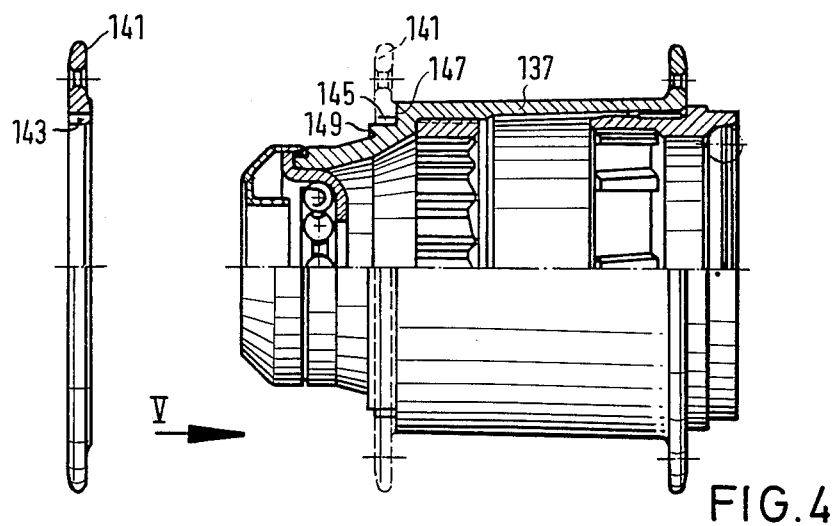
FIG. 4 shows a partially sectional exploded representation of another embodiment of a hub sleeve body usable in the drive hub according to FIG. 1.
Figure 5:
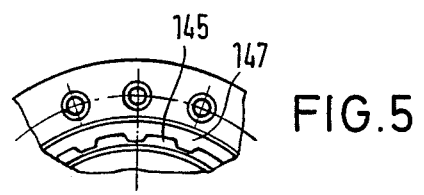
FIG. 5 shows a detail view of the hub sleeve body seen in the direction of the arrow V in FIG. 4.

FIGS. 4 and 5 show another embodiment of a hub sleeve body which differs from the hub sleeve body 3 according to FIGS. 1 to 3 solely in the manner of securing of a separately produced spoke flange 141 corresponding to the spoke flange 41, on a sleeve part 137 corresponding to the sleeve part 37. The annular spoke flange 141 carries on its internal circumference an axially ribbed internal toothing 143 which engages in a complementary, likewise axially ribbed external toothing 145. The external toothing 145 is cast integrally to the sleeve part 137. The toothings 143, 145 non-rotatably couple the spoke flange 141 with the sleeve part 137. An annular shoulder 147 axially facing the spoke flange 141 supports the spoke flange 141. For axial fixing the spoke flange 141 can be stuck to the sleeve part 137 and/or secured by caulking of an annular extension portion 149. Otherwise the construction and manner of operation of the drive hub correspond completely to the drive hub according to FIGS. 1 to 3, to the description of which reference is hereby made.

Figure 6:
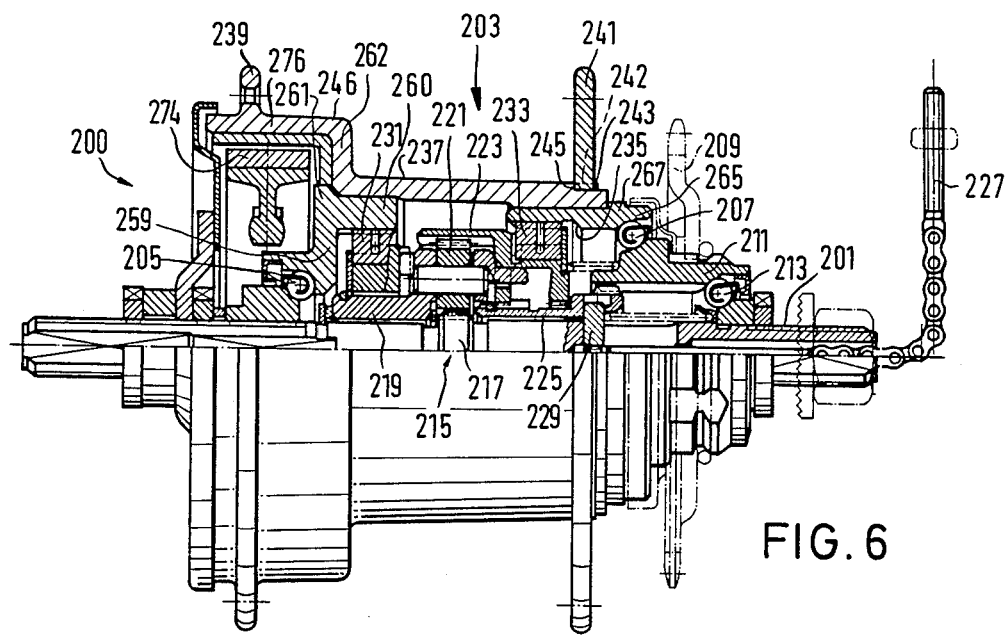
FIG. 6 shows a partially sectional representation of a three-speed freewheel drive hub of a bicycle with integrated drum brake and FIG. 7 shows a partially sectional representation of a hub sleeve body utilised in the drive hub according to FIG. 6.
Figure 7:
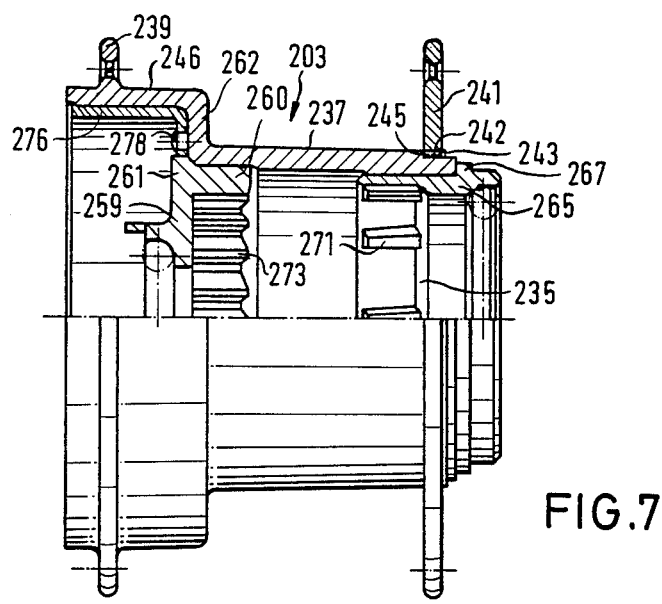

FIGS. 6 and 7 show another embodiment of a three-speed freewheel drive hub of a bicycle which differs from the drive hub according to FIGS. 1 to 3 essentially by an additional drum brake 200 and a corresponding configuration of its hub sleeve body rendering possible the integration of the drum brake 200. For the explanation of like parts of like effect of the drive hub as illustrated in FIGS. 6 and 7 reference is made to the description of the drive hub according to FIGS. 1 to 3, like parts or parts of like effect being designated with reference numerals increased by the number 200. The drive hub likewise comprises a hub spindle 201, a hub sleeve body 203, a first ball bearing 205 mounting the hub sleeve body 203 on the hub spindle 201, a second ball bearing 207 which mounts the hub sleeve body 203 on a drive member 211 carrying a chain wheel 209 and a third ball bearing 213 for the mounting of the drive member 211 on the hub spindle 201. The three-speed gear comprises a planetary gear 215 with a sun wheel 217, planet wheels mounted on a planet wheel carrier 219 and a hollow wheel 223. A coupling bush 225 mounted rotatably on the hub spindle 201 couples the drive member 211 alternatively with the planet wheel carrier 219 or the hollow wheel 223, in dependence upon the position of a draw linkage 227, by means of a thrust block 229. A freewheel ratchet 231 is arranged in the drive-output path of the planet wheel carrier. In the drive-output path of the hollow wheel 223 there is a free-wheel ratchet 233 which can be set out of action by means of a control taper 235. For further explanation of the manner of operation of the three-speed gear reference is further made to U.S. Pat. No. 4,059,028.

The hub sleeve body 203 again comprises a sleeve part 237 which is cast together with a spoke flange 239 integrally as a light metal die-casting in a pusherless die-casting mold. A second spoke flange 241 is produced separately as an annular component and is subsequently non-rotatably secured on the sleeve part 237 with axial spacing from the spoke flange 239. For this purpose the spoke flange 241 carries on its internal circumference an internal toothing 242 similar to the internal toothing 143 of the spoke flange 141 as represented in FIGS. 4 and 5. The internal toothing 242 engages in an external toothing of a radially outwardly facing seating surface 243 in the region of the end face of the sleeve part 237 axially facing the drive member 211. The spoke flange 241 is further supported with its side face axially remote from the chain wheel 209 on an axial shoulder 245 of the sleeve part 237. The spoke flange 241 can be stuck or fixed axially by caulking to the sleeve part 237.

A drum 246 is cast integrally on the sleeve part 237 on the side axially remote from the drive member 211. The drum 246 carries the spoke flange 239 on its external circumference. The external circumference of the spoke flange 239 forms the largest external diameter of the integral die-casting. Axially to both sides, starting from this largest diameter, the radial distance of every point of the external circumferential surface of the sleeve part 237 from the hub rotation axis exclusively decreases or at least remains constant. The smallest internal diameter of the sleeve part 237 is situated in the region of the driver end of the sleeve part. Starting from the minimum diameter the radial distance of the internal circumferential surface of the sleeve part 237, including the drum 246, exclusively increases or remains constant with increasing axial distance from the minimum diameter. The die-casting thus has no undercuttings of any kind and can be cast in a die-casting mold without radial pushers, cores or slides.

The ball bearing 205 runs in a bearing shell 259 which is pressed with a cylindrical extension 260 into the sleeve part 237. A stop flange 261 of the bearing shell 259 is supported on a drum end wall 262, radially widening the diameter of the drum 246, on the side axially opposite to the ball bearing 207. A bearing shell 265 of the ball bearing 207 is pressed into the end opening of the sleeve part 237 axially remote from the drum 246. The bearing shell 265 has a radially outwardly extending annular collar 267 which abuts from axially outside upon the end face of the sleeve part 237. The annular flange 261 and the annular collar 267 permit the axial adjustment of the hub sleeve body 203 in relation to the hub spindle 201. The bearing shell 265 is integrally provided with an internal toothing 271 of the freewheel ratchet 233. It further comprises the control taper 235. The bearing shell 259 is integrally provided with an internal toothing 273 of the ratchet 231. While the sleeve part 237 including the drum 246 consists of aluminium or an aluminium alloy, the bearing shells 259, 265 are manufactured from a harder material, especially steel.

The drum brake 200 is conventionally formed and comprises radially pivotably mounted brake shoes 274. In order to reduce the wear of the drum 246 the interior of the drum 246 is reinforced with a sheet steel ring 276.

The sheet steel ring 276, as by FIG. 7, is riveted to studs 278 protruding axially from the drum end wall 262. The studs 278 are cast integrally on the die-casting.

The spoke holes chamfered on both sides that are to be seen in the Figures in both spoke flanges 39, 41; 139, 141; 239, 241 are cast on in the die-casting process so that they require no finishing work.

While specific embodiments of the invention have been shown and described in detail to illustrate the application of the inventive principles, it will be understood that the invention may be embodied otherwise without departing from such principles.

I claim:

1. A hub for a two-wheeled vehicle comprising -
   (a) a hub spindle defining a rotation axis;
   (b) a hub sleeve enclosing the hub spindle and mounted rotatably thereon;
   (c) two spoke flanges arranged with axial spacing from one another, firmly connected with the hub sleeve and concentric with the hub spindle; wherein
   (d) the hub sleeve is a metal die-casting configured to be formed in a pusherless casting mold which can be opened by axial movement, one of the two spoke flanges being cast integrally with the metal die-casting;
   (e) on the external circumferential surface of the metal die-casting a seating surface is formed for the other of the two spoke flanges, to which surface this other spoke flange is rigidly secured;
   (f) in the entire external circumferential surface of the metal die-casting the radial distance of the outer circumferential surface from the rotation axis, starting from an outer circumference with maximum diameter, exclusively decreases or at least remains constant with increasing axial distance from the maximum external circumference; and
   (g) in the entire internal circumferential surface of the metal die-casting the radial distance of the inner circumferential surface from the rotation axis, starting from an internal circumference with minimum diameter, exclusively increases or at least remains constant with increasing axial distance from the minimum internal circumference.

2. A hub according to claim 1 wherein the hub sleeve is mounted on the hub spindle by means of at least two ball bearings arranged with axial spacing from one another, at least one of the two ball bearings comprising an outer race ring formed as a bearing sleeve held with press fit in a hollow cylindrical seating surface of the metal die-casting, wherein a shoulder surface facing axially outwards in relation to the hub sleeve is formed on the metal die-casting and wherein the outer race ring has an axially oppositely directed shoulder surface which abuts on the shoulder surface of the metal die-casting.

3. A hub according to claim 1 wherein the hub is formed as a drive hub and the hub sleeve is coupled with a drive member through at least one freewheel ratchet which comprises an internal toothing and at least one ratchet pawl engaging in the internal toothing, the internal toothing being provided on a first drive sleeve and the first drive sleeve being secured with a press fit on a seating surface of the inner circumferential surface of the metal die-casting.

4. A hub according to claim 1 wherein the hub is formed as a drive hub and the hub sleeve is coupled with a drive member through at least one freewheel ratchet which comprises an internal toothing and at least one ratchet pawl engaging in the internal toothing, the internal toothing being provided on a first drive sleeve and the first drive sleeve being secured on a seating surface of the inner circumferential surface of the metal die-casting in which the drive hub is formed as a multi-speed gear hub, wherein in the region of one of the two ends of the metal die-casting a tubular extension piece is cast integrally therewith coaxially with the hub sleeve, the smallest internal diameter of which extension piece is smaller than the internal diameter of the other end of the metal die-casting and to which a race ring surface of a ball bearing mounting the hub sleeve on the hub spindle is formed or secured, a second drive sleeve pressed in the hub sleeve, the external diameters of the first and second drive sleeves arranged axially side by side dimensioned smaller from drive sleeve to drive sleeve towards the tubular extension piece.

5. A hub according to claim 1 wherein the hub is formed as a drive hub and the hub sleeve is coupled with a drive member through at least one freewheel ratchet which comprises an internal toothing and at least one ratchet pawl engaging in the internal toothing, the internal toothing being provided on a first drive sleeve and the first drive sleeve being secured on a seating surface of the inner circumferential surface of the metal die-casting, in which the drive hub is formed as a multi-speed gear hub, wherein a hollow-cylindrical drum of a drum brake is cast integrally on one of the two ends of the hub sleeve, wherein axially between the drum of the drum brake and the other end and in the region of the other end shoulders facing axially away from one another are formed on the hub sleeve, which are adjoined by hollow cylindrical seating surfaces extending axially towards one another, and wherein in the seating surfaces there are secured drive sleeves which abut on the shoulders and at the same time form race ring surfaces for two ball bearings which mount the hub sleeve.

6. A hub according to claim 1 wherein the seating surface of the metal die-casting to which the spoke flange is secured has axial apertures and the spoke flange secured to this seating surface has axially extending studs which can fit axially into the apertures, for non-rotatably coupling the spoke flange with the metal die-casting.

7. A hub according to claim 1 wherein the seating surface of the metal die-casting to which the other spoke flange is secured comprises an axially extending external toothing and the spoke flange comprises a complementary, axially extending internal toothing for non-rotatably coupling the spoke flange with the metal die-casting.

8. A hub according to claim 1, wherein the metal die-casting consists of aluminium or an aluminium alloy.

* * * * *